W. MURRAY.
FIRE-SHIELD.

No. 178,659.  Patented June 13, 1876.

WITNESSES:
C. Neveux
John Goethals

INVENTOR:
Wm Murray
BY
ATTORNEYS.

UNITED STATES PATENT OFFICE.

WILLIAM MURRAY, OF VICKSBURG, MISSISSIPPI.

IMPROVEMENT IN FIRE-SHIELDS.

Specification forming part of Letters Patent No. 178,659, dated June 13, 1876; application filed May 16, 1876.

*To all whom it may concern:*

Be it known that I, WILLIAM MURRAY, of Vicksburg, county of Warren, and State of Mississippi, have invented a new and Improved Firemen's Protecting Apparatus, of which the following is a specification:

My invention consists of coupling joints and pipes for quickly erecting frames for scaffolds, and for supporting plates to protect firemen from the heat of a burning building, the object being to enable them to approach closer to a burning building, and to afford protection to other buildings by being set up between them and the burning buildings.

Figure 1:
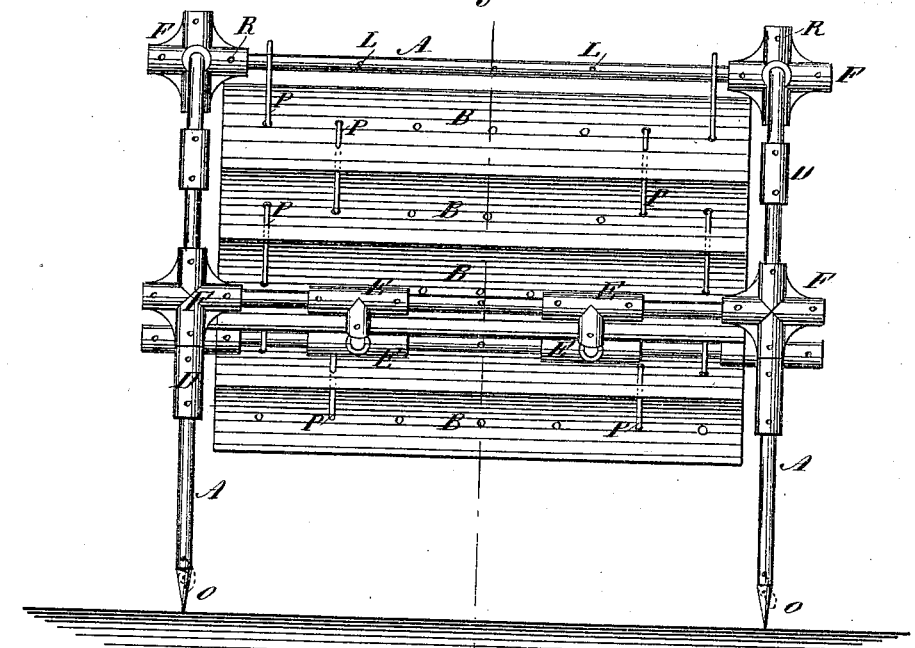
Figure 2:
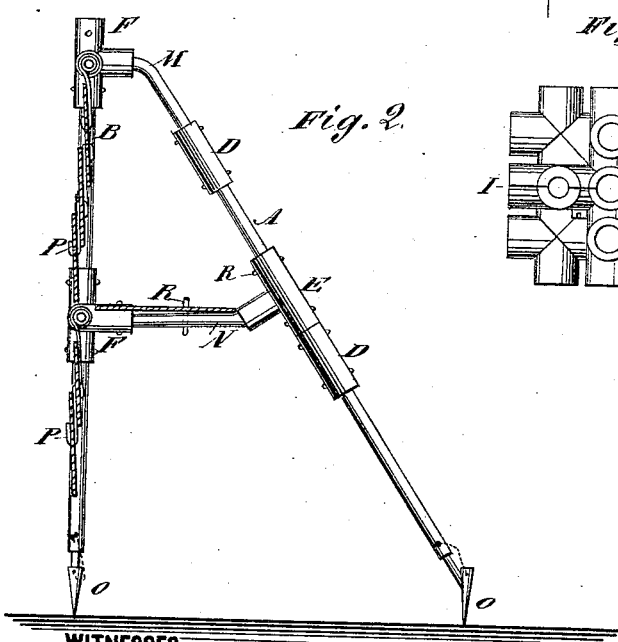
Figure 3:
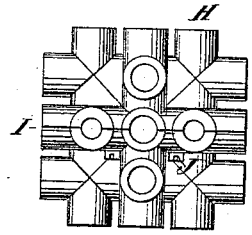
Figure 4:
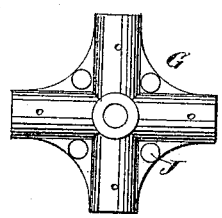
Figure 5:
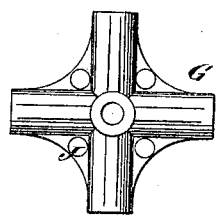

Figure 1 is a side elevation of my improved apparatus. Fig. 2 is a side elevation taken on the line $x\ x$, Fig. 1. Figs. 3, 4, and 5 are side elevations of different forms of couplings to be used in connecting the tubes of which the frames are made.

Similar letters of reference indicate corresponding parts.

I propose to take gas or other suitable tubing, in suitable size for strength and of all required lengths, and erect scaffold-frames for supporting curtains of metal plates B, to be hung on them, the said tubes being connected together by couplings of two or more socket ends, according to the number of tubes to be connected, the said couplings being, when necessary, made in two parts, to be clamped on rods already set up and coupled at any point that may be desired, the said parts being bolted together through holes provided for that purpose.

D represents a coupling of two socket ends, for connecting two pipes in a right line; E, one of three ends; F, one of five ends; G, one of six ends, and H one of thirty ends. Those of six and more ends are made in two parts, which join together on the line I, and are bolted together at J, in order that they may be applied anywhere on pipes already set up, for connecting other pipes for extending the frame in different directions, to support scaffolds and for other purposes.

The tubes will be fastened on the couplings by pins R, and, for allowing the application of couplings at different points, the tubes will be bored with pin-holes L at suitable intervals apart. Some of the tubes will be bent, as at M, to allow the rods to run obliquely from the point of connection, as when employed for braces, and for the connection of scaffold-supports W and the like.

At the lower ends of the upright tubes and braces steel points O will be attached, for entering the ground to obtain firm support. The plates B are hooked on the rods, and connected together by hooks P, which are detachably connected. These curtain-plates will also be used for scaffolds, for the firemen to stand on. The curtain-plates are coupled from center to center, so that any one can be turned to open a space through which a nozzle may be inserted to play on the fire.

Having thus described my invention, I claim as new and desire to secure by Letters Patent—

1. The combination of tubes, couplings, curtain and scaffold plates, substantially as shown and described.

2. The curtain-plates, coupled from center to center, as described, for passing the hose-nozzle between them, substantially as specified.

WILLIAM MURRAY.

Witnesses:
N. G. MOORE,
G. F. BROWN, Jr.